April 21, 1964     A. KÄCH     3,130,330

MAGNETOHYDRODYNAMIC GENERATOR

Filed Aug. 8, 1960

INVENTOR.
Alfred Käch
BY
Pierce, Scheffler & Parker
Attorneys sized Apr. 21, 1964

3,130,330
MAGNETOHYDRODYNAMIC GENERATOR
Alfred Käch, Nussbaumen, Aargau, Switzerland, assignor to Aktiengesellschaft Brown, Boveri & Cie, Baden, Switzerland, a joint-stock company
Filed Aug. 8, 1960, Ser. No. 47,973
Claims priority, application Switzerland Aug. 8, 1959
6 Claims. (Cl. 310—11)

This invention relates to electrical generators and more particularly to generators of the "magnetohydrodynamic" type wherein an electrical output is generated by direct conversion from a heat output. Such known generators comprise a channel, a stream of ionized gas through the channel, current-collecting electrodes within the channel and means for producing a magnetic field which penetrates the channel perpendicular to the direction of the flow of the gas so as to cause an electrical voltage to occur in the gas between the electrodes during operation of the generator.

An object of the invention is to provide an improved electrical generator of the direct-conversion type mentioned which produces an alternating current as distinguished from the known arrangement wherein a direct current produced by such a generator is thereafter transformed into alternating current. In accordance with the invention, the improved alternating current generator utilizes a magnetic field which changes its direction at the desired frequency but which has a constant field strength. In accordance with the invention, the magnetic field rotates and is established by means of a stator having at least three pole heads each carrying a magnetizing winding.

In the accompanying drawings, FIG. 1 is a longitudinal view partly in section on line I—I of FIG. 2 showing a conventional construction for a generator of the magnetohydrodynamic type;

Figure 1:
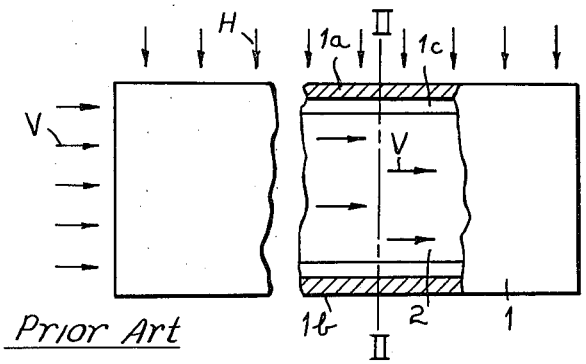
Figure 2:
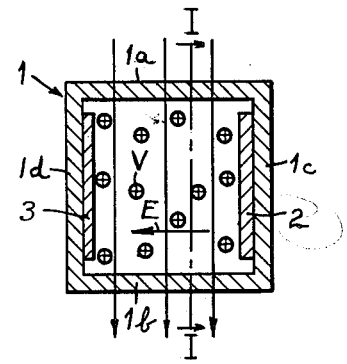
FIG. 2 is a transverse section on line II—II of FIG. 1.

With reference now to the drawings, and to FIGS. 1 and 2 in particular, there is shown a known construction for a generator of the magnetohydrodynamic type which is capable of generating a high electrical output. The generator comprises an elongated tubular duct or channel 1 which, in the illustrated embodiment, is of square cross-section, the four side walls of the channel being designated by numerals 1a, 1b, 1c and 1d. An ionized gas indicated by letter V is passed longitudinally through the channel 1 at high temperature and at high speed. Passing through one pair of opposed side walls 1a, 1b of the channel is a magnetic field indicated by letter H, the direction of the field within the channel being transverse to the direction of flow of the gas V. The internal faces of the two other opposite side walls 1c, 1d are provided respectively with longitudinally extending planar electrode plates 2 and 3 which are exposed to the ionized gas. During operation of the generator there occurs between the electrodes 2 and 3 a direct voltage E having a magnitude which depends, among other things, on the flow velocity of the gas and on the strength of the magnetic field. Investigations show that with a channel 1 of a length of the order of ten meters, a channel cross section of the order of one square meter, flow velocities of the ionized gas (for example, air having a temperature of roundly 2,000° K.) of the order of one thousand meters per second, and magnetic fields having a strength of the order of ten thousand gausses, there can be obtained an output of more than one hundred mw. at voltages of the order of one thousand volts.

The previously known arrangements have been designed for generation of direct current. Consequently, when it is desired to employ such arrangements in power stations for feeding existing high-voltage alternating current distribution networks, it has been necessary to transform this direct current to alternating current. Because of the relatively great outputs at relatively low voltages, the transformation process involves considerable difficulties and entails relatively high costs.

In accordance with the present invention, alternating current is generated directly by the magnetohydrodynamic generator. Consequently, the alternating current output from the generator can be connected directly over the shortest path with a high-voltage alternating current distribution transformer, so that the high-current alternating current circuit from the generator is relatively short. This eliminates switching contacts and commutators.

Upon first consideration there would seem to readily arise the idea of utilizing an arrangement according to FIGS. 1 and 2 for generation of alternating current by applying a pulsating magnetic field of temporarily-sinuously-variable strength. However, due to the temporarily-variable influencing of the gas flow by such pulsating magnetic field, pressure waves occur periodically in a direction longitudinally of the channel. Consequently, this manner of generating alternating current is not practical because of gas-kinetic reasons.

In accordance with this invention, there is provided a magnetic field which changes its direction at the desired frequency but which, for the avoidance of the disturbing pressure waves in the ionized gas stream, always exhibits the same field strength. Consequently, with a generator in accordance with the invention, the means for generation of the magnetic field are formulated in such a manner that they are suitable for generation of a magnetic rotary field.

Figure 3:
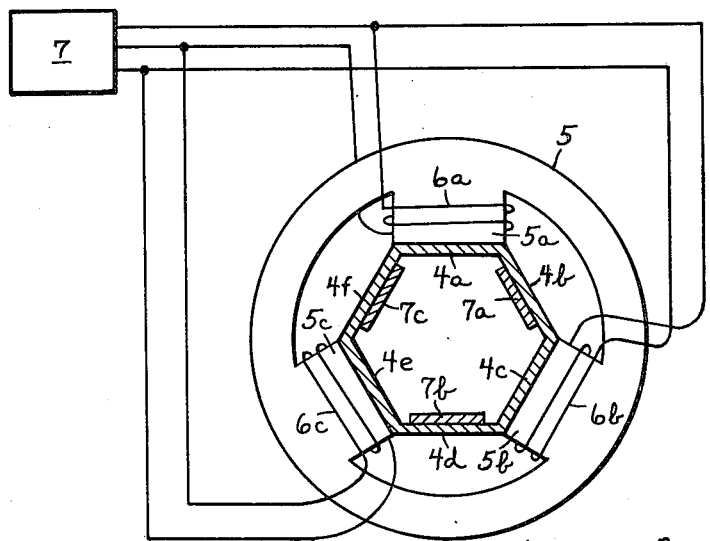
FIG. 3 is a transverse sectional view of an improved generator in accordance with the present invention.

The principles of the invention are illustrated somewhat schematically in FIG. 3 which is suitable for generation of three-phase alternating current. The means for generation of the magnetic rotary field rotating about the longitudinal axis of the channel comprises a stator 5 which includes three pole heads 5a, 5b and 5c projecting radially inward at an angular spacing of 120° and which abut against correspondingly spaced walls 4a, 4c, 4e of the channel which has the cross-section of a regular hexagon. The pole heads 5a–5c carry excited windings 6a–6c, respectively and these are connected to the required rotary-current source 7. The other three walls 4b, 4d and 4f of the channel, i.e., those walls which lie between the pole heads 5a–5c are provided with electrode plates 7a, 7b and 7c respectively, from which the generated rotary current output is taken off in triangular connection. Of course, there can also be provided a stator having six pole heads, i.e., three pairs of diametrically opposite pole heads and with each such pair of diametrically opposed pole heads fed from a different phase of the rotary current source.

Figure 4:
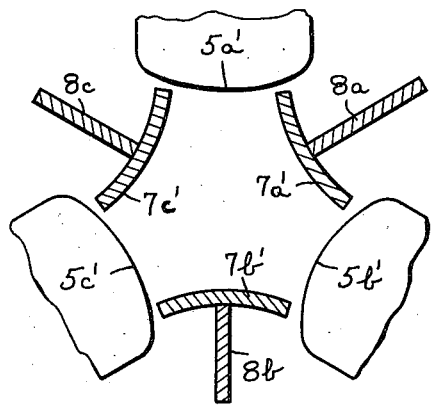
FIG. 4 is a view similar to FIG. 2 but showing a modification of the configuration of the magnetic pole heads and the electrode plates.

The modified embodiment of the invention illustrated in FIG. 4 provides special configurations for the pole heads and electrode plates which result in especially favorable magnetic and electrical characteristics. The pole heads and electrode plates are designated in generally the same manner as in FIG. 3 but with primes added to the various elements for purposes of distinction.

As seen in FIG. 4, the inner boundary lines of the surfaces of the pole heads 5a', 5b' and 5c' and of the electrodes 7a', 7b' and 7c' are perpendicular to each other at their points of intersection. This condition can be fulfilled, by a curvature of the pole head surfaces facing the ionized gas stream, or by a curvature of the electrodes, or as shown, by a curvature of all of these surfaces. The scatter field occurring outside the electrodes between the pole heads can be suppressed in a known manner by use of short-circuit windings. In the present case, these short-circuit windings may consist of the radially extending lead-ins 8a, 8b and 8c which, for this purpose must extend at least approximately over the whole length of the stator.

I claim:

1. A magnetohydrodynamic generator which comprises a channel traversed by an ionized gas, said channel being provided with electrodes for taking off the generated current which flows between said electrodes in a direction transverse to the direction of flow of said ionized gas through said channel, and means for producing a magnetic field extending across said channel transverse to the direction of the gas flow therethrough, characterized by the fact that the means for producing the magnetic field are formulated for generation of a magnetic rotary field of substantially constant field strength.

2. A magnetohydrodynamic generator as defined in claim 1 wherein said means for producing said rotary magnetic field comprises a stator having at least three pole heads.

3. A magnetohydrodynamic generator as defined in claim 2 wherein each of the electrodes is located between two pole heads.

4. A magnetohydrodynamic generator as defined in claim 2 characterized in that the surfaces of the pole heads and the electrodes are perpendicular to each other along the common lines of intersection.

5. A magnetohydrodynamic generator as defined in claim 2 and which further includes short-circuit windings against magnetic scatter fields disposed outside said channel between the pole heads.

6. A magnetohydrodynamic generator as defined in claim 5 wherein said short-circuit windings are formulated by lead-ins to said electrodes.

References Cited in the file of this patent

UNITED STATES PATENTS 2,722,122    Soffel _____ Nov. 1, 1955

FOREIGN PATENTS 738,511    Great Britain _____ Oct. 12, 1955